United States Patent [19]

Masui et al.

[11] Patent Number: 4,464,696
[45] Date of Patent: Aug. 7, 1984

[54] SECONDARY ARC EXTINCTION DEVICE

[75] Inventors: Michio Masui, Yokohama; Yasuhiro Ogawa, Kamagaya; Kunio Esumi, Yokohama, all of Japan

[73] Assignee: Tokyo Shibaura Denki Kabushiki Kaisha, Kawasaki, Japan

[21] Appl. No.: 379,958

[22] Filed: May 19, 1982

[30] Foreign Application Priority Data

May 19, 1981 [JP] Japan .................................. 56-75174

[51] Int. Cl.³ .............................................. H02H 3/16
[52] U.S. Cl. ..................................... 361/42; 323/210; 361/43
[58] Field of Search ..................... 361/42, 43; 323/205, 323/208, 209, 210, 211

[56] References Cited

FOREIGN PATENT DOCUMENTS

| 1964823 | 6/1971 | Fed. Rep. of Germany | 323/210 |
| 748620 | 7/1980 | U.S.S.R. | 361/43 |
| 792474 | 12/1980 | U.S.S.R. | 361/42 |
| 807438 | 2/1981 | U.S.S.R. | 361/43 |
| 807432 | 2/1981 | U.S.S.R. | 361/42 |

OTHER PUBLICATIONS

"Soviet Inventions Illustrated", Week C30, Sep. 3, 1980, Section X13.
"Soviet Inventions Illustrated", Week C15, May 21, 1980, Sections R51, R53.
"The Application of Controlled Reactive Compensation for Single Pole Switching on Long EHV Line Sections"—Woodford, International Symposium on Controlled Reactive Compensation, Sep. 19–21, 1979.

Primary Examiner—Harry E. Moose, Jr.
Attorney, Agent, or Firm—Oblon, Fisher, Spivak, McClelland & Maier

[57] ABSTRACT

A secondary arc extinction device in an electric power system including a bus bar; an electric power line connected to the bus bar; protective relaying means connected to the bus bar; a transformer having a primary winding and a secondary winding, one terminal of the primary winding being connected to the electric power line; first reactance means connected between the other terminal of the primary winding of the transformer and ground; second reactance means connected to the secondary winding of the transformer; and means for controlling the reactance of the second reactance means in response to the protective relaying means.

7 Claims, 10 Drawing Figures

U.S. Patent  Aug. 7, 1984  4,464,696
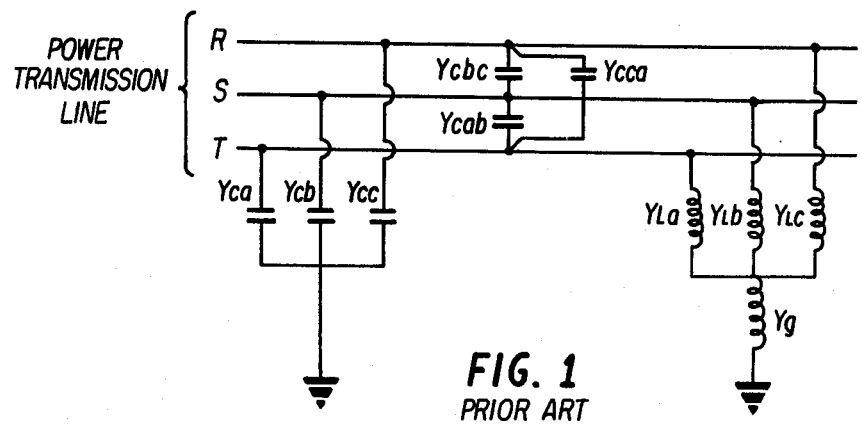
FIG. 1
PRIOR ART
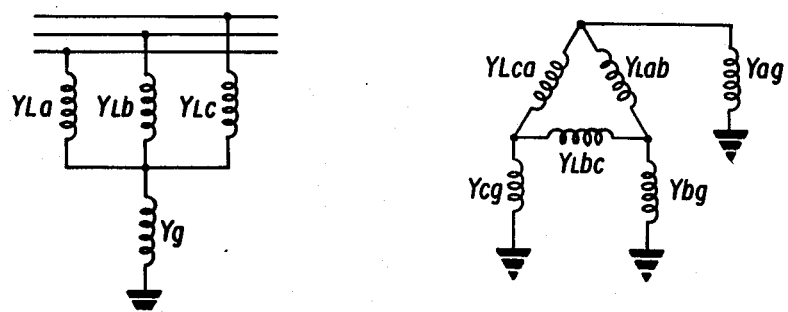
FIG. 2(a)
PRIOR ART
FIG. 2(b)
PRIOR ART
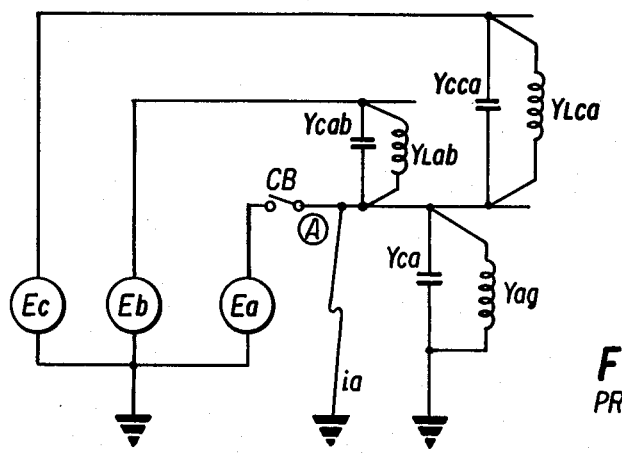
FIG. 3
PRIOR ART

SECONDARY ARC EXTINCTION DEVICE

BACKGROUND OF THE INVENTION

1. Field of the Invention

The present invention relates to a secondary arc extinction device in a multi-conductor transmission line electric power system in which an electrostatic coupling between the lines is strong and problems are thereby caused.

2. Description of the Prior Art

The above-noted problems are that the arc generated by back flashover at the installation of the insulator for the transmission line (which is hereinafter referred to as "secondary arc") is not extinguished to disable the reclosing at a high speed or it is impossible to take a sufficient non-voltage period of time by the fact that the induction electric current or the induction voltage is supplied from the whole phase or the whole line due to the electrostatic coupling even after the circuit breakers at both ends of the transmission line are interrupted when there is caused a short circuit due to the damage caused by lightning or the like at the insulator installation.

Nextly described with the aid of FIGS. 1, 2a, 2b, 3 and 4 is the conventional electric power transmission line system. Specifically, a power transmission line (R, S & T phases) is considered wherein the fixed reactor with zero phase, i.e., the reactor between the neutral point of the star-connection and ground, compensation is provided as shown in FIG. 1. In FIG. 1, $Y_{ca}$: power transmission line a phase ground admittance, $Y_{cb}$: power transmission line b phase ground admittance, $Y_{cc}$: power transmission line c phase ground admittance, $Y_{cab}$: power transmission line a-b phase interphase admittance $Y_{cbc}$: power transmission line b-c phase interphase admittance $Y_{cca}$: power transmission line c-a phase interphase admittance $Y_{La}$: $\omega.La$: reactor a phase admittance, $Y_{Lb}$: $\omega.Lb$: reactor b phase admittance, $Y_{Lc}$: $\omega.Lc$: reactor c phase admittance, $Y_g$: $\omega.Lg$: neutral point reactor admittance, $L_a$: reactor a phase reactance, $L_b$: reactor b phase reactance, $L_c$: reactor c phase reactance, $L_g$: neutral point reactor reactance, In addition, the reactor with zero phase compensation which is shown in FIG. 2(a) can be resolved into components between lines, as well as ground components as shown in FIG. 2(b). In FIG. 2(b), if it is assumed that $m = Y_{La} + Y_{Lb} + T_{Lc} + Y_g$, each admittance will be obtained as the following:

$Y_{Lab} = Y_{La} \cdot Y_{Lb}/m$ $Y_{Lbc} = Y_{Lb} \cdot Y_{Lc}/m$ $Y_{Lca} = Y_{Lc} \cdot Y_{La}/m$ $Y_{ag} = Y_a \cdot Y_g/m$ $Y_{bg} = Y_b \cdot Y_g/m$ $Y_{cg} = Y_c \cdot Y_g/m$ On the other hand, as shown in FIG. 3, there is considered a state in which the a phase circuit breaker CB is opened after an a phase ground short-circuit problem has occurred. Then, an induced electric current $i_a$ flows into the problem point A from the other whole phases b and c, not undergoing a fault by way of $Y_{cab}$ and $Y_{cca}$. In addition, the condition of the recovery voltage $v_r$ and the secondary arc current $i_a$ for the continuation of the secondary arc is dependent upon the weather conditions, the primary arc current, the time, the design of the insulator of the line, etc. In other words, it becomes possible to extinguish the secondary arc if it becomes possible to limit the secondary arc current and the recovery voltage in a range which either the recovery voltage $v_r$ or the secondary arc current $i_a$ is small.

However, the induction via the power transmission line phase ground admittances $Y_{caa'}$, $Y_{cab'}$ and $Y_{cac'}$ from the whole transmission line is received in the case of a juxtaposed pair of transmission lines as shown in FIG. 4, but it is difficult to compensate for the capacitance between the lines with the reactor which is constituted as shown in FIG. 1.

SUMMARY OF THE INVENTION

Accordingly, one object of the present invention is to provide a novel secondary arc extinction device in an electric power system in which it is possible to shorten the period of time for extinction of secondary arcs caused by all kinds of problems.

Another object is to provide a new and improved power transmission system, especially a UHV system, provided with active countermeasures for the extinction of secondary arcs.

These and other objects are achieved according to the invention by providing a novel secondary arc extinction device in an electric power system in which the reactance value of each phase reactor is made variable in a continuous manner by effecting thyristor phase control and the star-connection reactor which has a reactor between the neutral point of the star-connection reactor and ground (as seen from the system, and which is hereinafter referred to as "reactor with zero phase compensation"), and in which the reactance value of each phase reactor is capable of being controlled to the most optimum reactance value for extinction of secondary arcs. Contrary to the conventional system in which highspeed multi-phase reclosing is carried out with nothing as a countermeasure, the present invention provides an active countermeasure for extinction of secondary arcs in the UHV power transmission system, versus the mere provision of a fixed reactor with zero phase compensation as is otherwise conventional.

Briefly, in accordance with one embodiment of this invention, a secondary arc extinction device in an electric power system is provided which includes a bus bar; an electric power line connected to the bus bar; protective relaying means connected to the bus bar; a transformer having a primary winding and a secondary winding, one terminal of the primary winding being connected to the electric power line; first reactance means connected between the other terminal of the primary winding of the transformer and ground; second reactance means connected to the secondary winding the transformer; and means for controlling the second reactance means in response to the protective relaying means.

BRIEF DESCRIPTION OF THE DRAWINGS

A more complete appreciation of the invention will be readily obtained as the same becomes better understood by reference to the following detailed description when considered in connection with the accompanying drawings, wherein:

FIG. 1 is a circuit diagram of a conventional electric power transmission line with a fixed reactor with zero phase compensation;

FIGS. 2(a) and 2(b) are respectively circuit diagrams of a part of FIG. 1 and an equivalent circuit of a portion of the circuit of FIGS. 2(a);

FIG. 3 is a diagram showing when an a phase 1 ground short-circuit occurs in the conventional electric power transmission line;

DETAILED DESCRIPTION OF THE PREFERRED EMBODIMENTS

Figure 4:
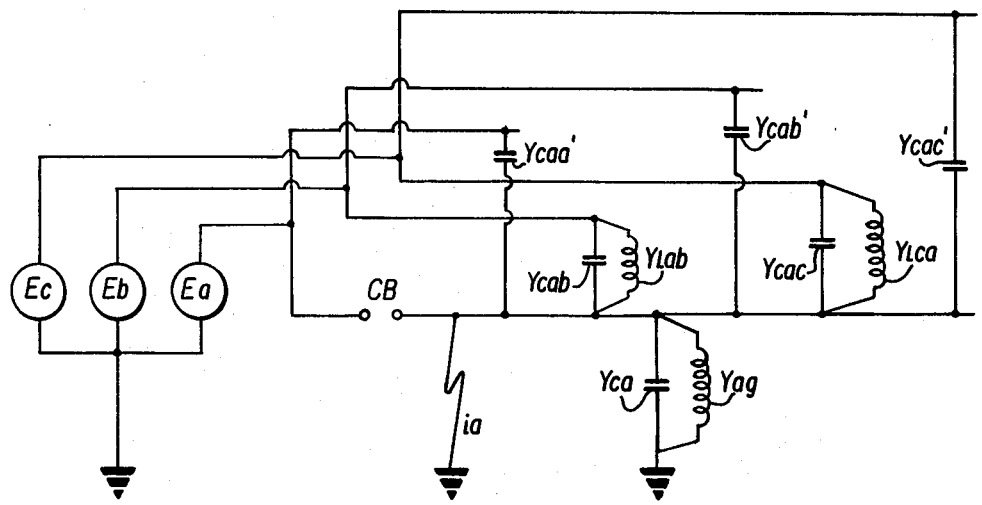
FIG. 4 is a diagram showing when an a phase 1 ground short-circuit occurs in the conventional juxtaposed multi-line power transmission system.

The present invention shortens the period of time for extinction of secondary arc with the reactor with zero phase compensation by producing parallel resonance in the circuits of $Y_{cca}$ and $Y_{Lca}$, $Y_{cab}$ and $Y_{Lab}$ respectively in the circuit which is shown in FIG. 3, so that the impedance becomes infinite, thereby making zero the electric current between the (A) point and ground and the recovery voltage, or making them approach zero. In other words, it becomes possible to make zero both the secondary arc current and the recovery voltage in the transmission line of one line by choosing the reactance of the reactor in such a way that the capacitance between the lines and the reactor between the lines resonate in parallel.

The continuous control of the reactive power is also the continuous control of the reactance value. The continuous reactance control ability of the thyristor phase control reactor is utilized according to the present invention.

Referring now to the drawings, wherein like reference numerals and letters designate identical or corresponding parts throughout the several views, and more particularly to FIG. 5 thereof, one embodiment in accordance with the invention will be explained with reference to the accompanying drawings.

Figure 5:
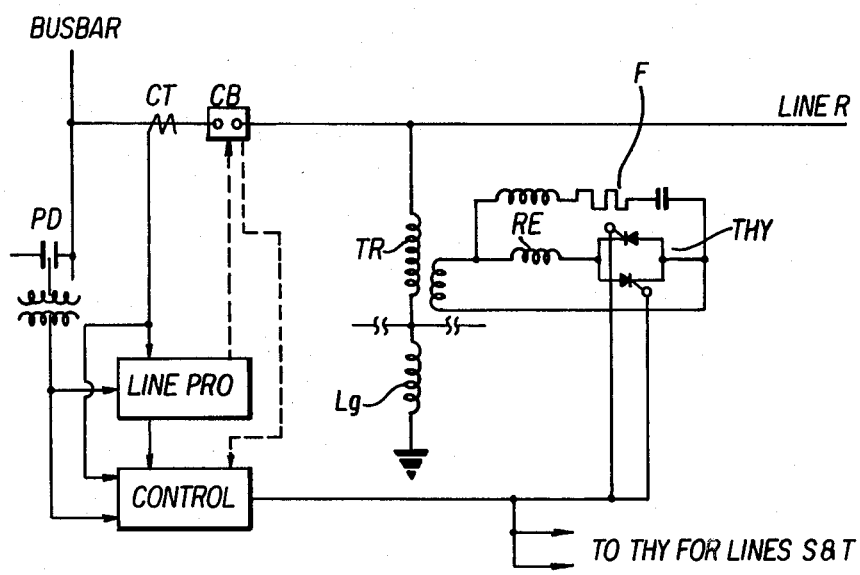
FIG. 5 is a circuit diagram showing one embodiment of secondary arc extinction device in accordance with the present invention.

FIG. 5 shows an example of a secondary arc extinction device in an electric power system in accordance with the present invention. In FIG. 5, there is provided a thyristor phase control reactor with zero phase compensation at a service entrance of an electric station, a substation or a connection station between the bus bar and the line. This reactor is capable of varying the reactance value of each phase in a continuous manner by effecting the phase control of the thyristor.

A protective relay LINE PRO, as well known, generates a trip signal (dotted line) to be transmitted to a circuit breaker CB in response to outputs from a current transformer CT and a potential transformer PD when a ground fault occurs in a range to be protected.

As described in FIGS. 1 and 2, one terminal of the primary windings of transformers TR for dropping voltage are connected to each phase line (only one phase R is shown in FIG. 5 for the sake of brevity) as a star-connection. Between the neutral point of the star-connected transformers TR and ground a reactor $L_g$ is provided.

The secondary winding of the transformer TR is connected to a series connection of a phase reactor RE and anti-parallel connected thyristors THY and a filter F.

A control device CONTROL receives outputs from the current transformer CT, the potential transformer PD, the protective relay LINE PRO and an auxiliary contact (b contact, not shown) of circuit breaker CB. Control device CONTROL generates a signal to change the conduction angle of thyristor THY to a predetermined value so as to produce parallel resonance, e.g., in the circuits of $Y_{cca}$ and $Y_{Lca}$, $Y_{cab}$ and $Y_{Lab}$ in FIG. 3 when a fault occurs, as described hereinafter with regard to FIGS. 7 and 8 in more detail.

When a fault occurs, the reactance of the transformer TR of each phase is controlled by the thyristor THY so as to change the reactance to a predetermined value.

As a result, it is possible to extinguish the secondary arc so that the capacitance between the lines and the controlled reactance between the lines resonate in parallel.

Figure 6A:
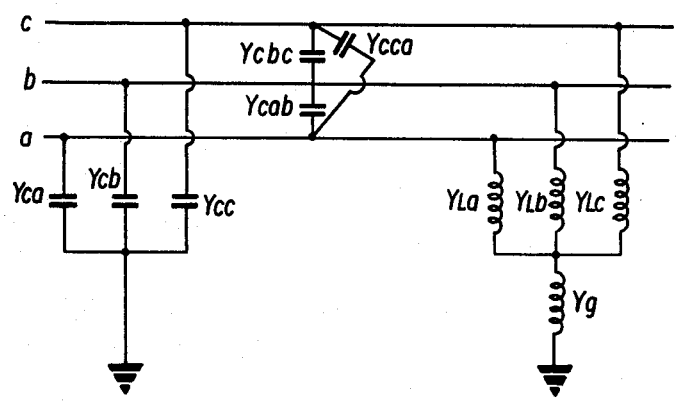
FIGS. 6(a) and 6(b) are circuit diagrams of electric power transmission lines employing the active countermeasures of the present invention.
Figure 6B:
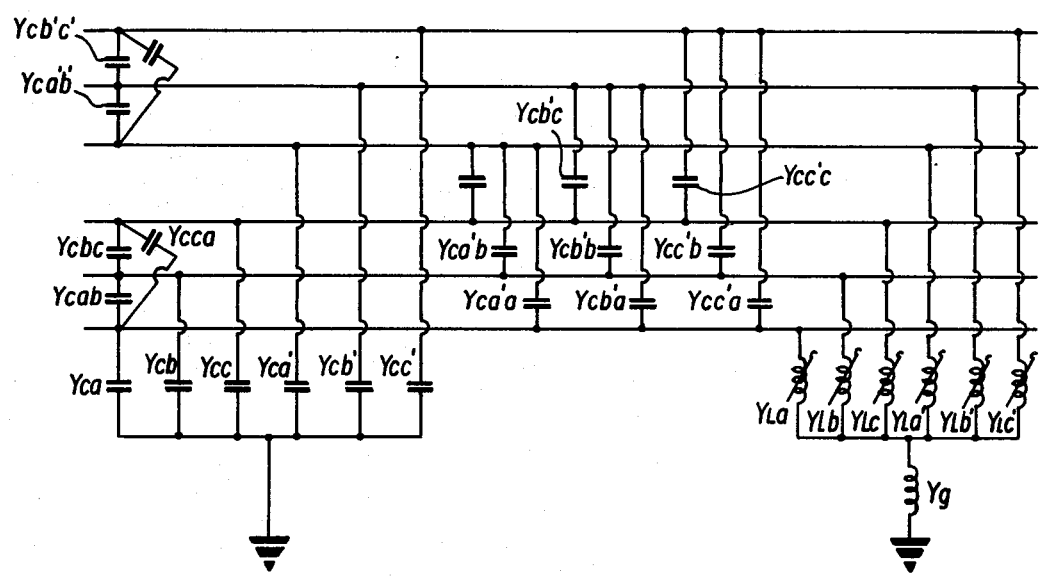

For example, the thyristor phase control reactor with zero phase compensation is constituted in such a way that only the interphase capacitance of its own line is compensated for as shown in FIG. 6(a) or in such a way that even the capacitance between the lines is compensated for as shown in FIG. 6(b). In addition, in a juxtaposed multicircuit power transmission system, all capacitance, (interphase capacitance, the capacitance between the link shown in FIG. 6B) are used to match the parallel resonance condition.

Figure 7:
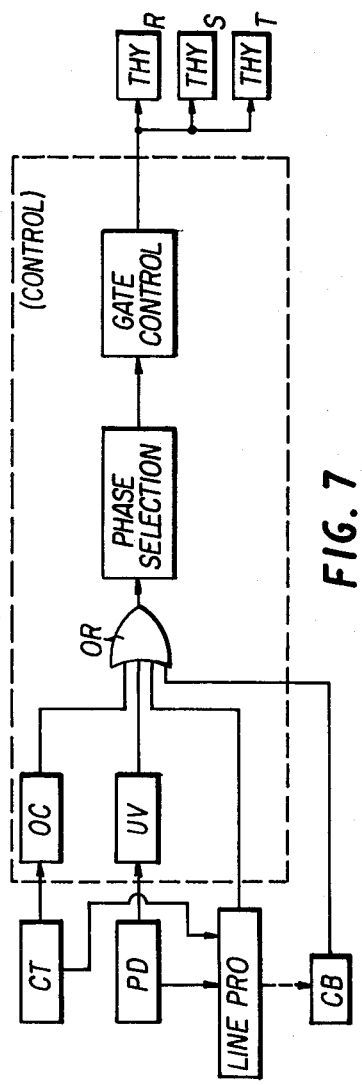
FIG. 7 is a block diagram of one embodiment of a control device shown in FIG. 5.

FIG. 7 is a example of the above mentioned control means CONTROL in accordance with which the troubled phase is identified at PHASE SELECTION portion by the operative condition of the circuit breaker CB or the operative condition of the protective relay LINEPRO of a line or a troubled phase selection relay such as over current relay OC, undervoltage relay UV or the like and the gate ignition angle of the thyristor THY is determined at the GATE CONTROL portion so as to transmit an ignition signal to the thyristor THY. Now, if a gate ignition angle is set in advance which is in correspondence with the most suitable reactance value of each phase which is capable of compensating for the interphase capacitance or the capacitance between the lines by the condition of the troubled phase, it becomes possible to instantaneously respond in determining the ignition angle of the thyristor gate at the GATE CONTROL portion. In other words, the PHASE SELECTION portion functions to select the reactance value (ignition angle) in advance in response to the kind of faults and kind of transmission system.

Thus, the secondary arc extinction device in an electric power system is constituted in such a way that a thyristor phase control reactor with zero phase compensation is provided at a service entrance of a line in an electric place, a trouble phase is identified by a trip signal condition of a protective relay LINE PRO for a line or by the operative condition of a relay OC, UV for selecting a trouble phase or by the operative condition (b contact, not shown) of the circuit breaker CB and a reactance value of each phase is controlled to be a predetermined value so as to match the parallel resonance condition above-described.

Therefore, it becomes possible to make short the period of time for extinction of the secondary arc in the power transmission system and furthermore, the reclosing is made possible if the means for extinction of secondary arc as mentioned above is employed. Although it is impossible to gather together the reactors for reactive power control of the system at the service entrance of the line in the case of the fixed reactor, it becomes possible to do so in accordance with the device of this invention because the reactance value is made variable. In addition, it is possible to constitute as a combination of a thyristor phase control reactor and a circuit breaker switching control capacitor, in other words, to constitute in combination with the capacitor equipment. Therefore, it is possible to provide the reactive power control means in such a way as to be gathered together at the service entrance of the line, which will also become possible to be used at the time when any trouble is caused for the line so as to shorten the period of time for extinction of the secondary arc. In addition, since it is possible to use the floating capacitance of the line as the advance capacitance by controlling the reactor current, it becomes possible for the electric station as a whole to save the capacitor, which is quite advantageous from an economical viewpoint.

Another embodiment of a secondary arc extinction device in accordance with the present invention will be explained with reference to FIG. 8, wherein the output of the ground protective relay GND LINE PRO and the output of "OR" gate OR are supplied to an "AND" gate AND.

The "AND" gate AND is employed for prohibiting the operation of thyristor THY in the event of an interphase short-circuit. In other words, even if the output of current transformer CT is generated when the interphase short-circuit occurs ground protective relay GND LINE PRO does not function.

Figure 8:
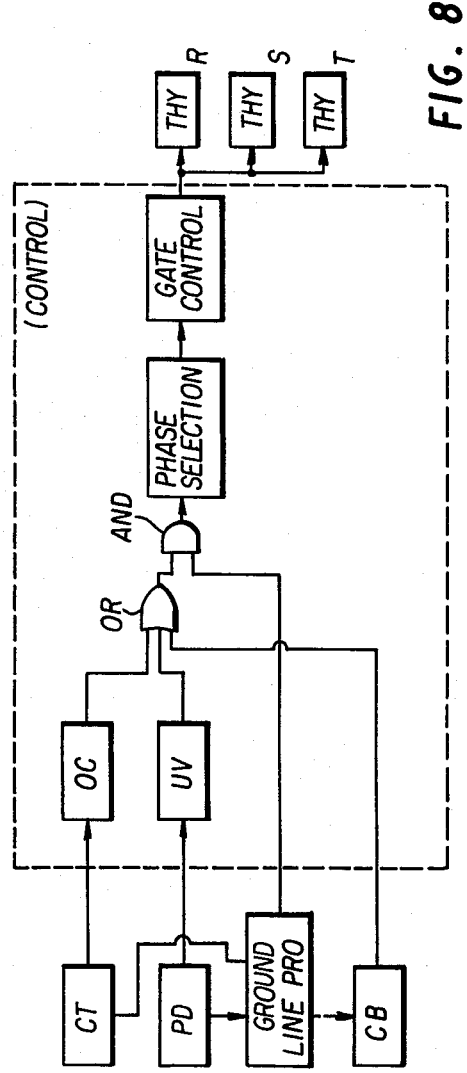
FIG. 8 is a block diagram of another embodiment of a control device shown in FIG. 5.

Therefore, when the interphase short-circuit occurs, thyristor THY, i.e., reactance value of each phase is not controlled in the FIG. 8 embodiment.

The present invention is not limited to the above mentioned embodiments but may be varied and carried out in various manners without varying the gist of the invention.

In accordance with the present invention as mentioned above, since a thyristor phase control reactor with zero phase compensation is provided at a service entrance of a line in an electric installation, a problem phase is identified by a trip signal condition of a relay for protecting a line or by the operative condition of a relay for selecting a problem phase or by the operative condition of a circuit breaker, and a reactance value of the reactor of each phase is controlled to a predetermined value which is most suitable for producing parallel resonance, it becomes possible to provide a means for extinction of a secondary arc in an electric power system which is very reliable and in accordance with which it is possible to make short the period of time for extinction of the secondary arc irrespective of the cause thereof.

Obviously, numerous additional modifications and varitions of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A secondary arc extinction device in an electric power system comprising:
    a bus bar;
    an electric power line connected to said bus bar;
    protective relaying means connected to said bus bar;
    a transformer having a primary winding and a secondary winding, one terminal of said primary winding being connected to said electric power line;
    first reactance means connected between the other terminal of said primary winding of said transformer and ground;
    second reactance means connected to said secondary winding of said transformer; and
    means for controlling the reactance of said second reactance means in response to said protective relaying means to produce resonance to extinguish a secondary arc when the secondary arc occurs.

2. A secondary arc extinction device as recited in claim 1, wherein said second reactance means comprises:
    a semiconductor switching element, and
    a reactor connected in series therewith.

3. A secondary arc extinction device as recited in claim 2, wherein said semiconductor switching element comprises:
    anti-parallel connected thyristors.

4. A secondary arc extinction device as recited in claim 1, further comprising:
    a filter connected to said secondary winding of said transformer.

5. A secondary arc extinction device as recited in claim 1, wherein said second reactance means are provided with each phase of said electric power line.

6. A secondary arc extinction device as recited in claim 3, further comprising:
    a current transformer connected to said bus bar;
    a potential transformer connected to said bus bar;
    a circuit breaker having an auxiliary contact connected between said bus bar and said electric power line for activating said protective relaying means;
    an OR gate connected to said current transformer, said potential transformer, said protective relaying means and said auxiliary contact of circuit breaker; and
    means for setting the firing angle of said thyristors of said second reactance means to a predetermined value in response to an output of said OR gate.

7. A secondary arc extinction device as recited in claim 3, further comprising:
    a current transformer connected to said bus bar;
    a potential transformer connected to said bus bar;
    a ground protective relaying means connected to said bus bar;
    a circuit breaker having an auxiliary contact connected between said bus bar and said electric power line for activating said ground protective relaying means;
    an OR gate connected to said current transformer, said potential transformer and said auxiliary contact of circuit breaker;
    an AND gate connected to said OR gate and said ground protective relaying means; and
    means for setting the firing angle of said thyristors of said second reactance means to a predetermined value in response to an output of said AND gate.

* * * * *